J. M. TEIJELO.
DIRECTION INDICATING SIGNAL FOR MOTOR VEHICLES.
APPLICATION FILED MAR. 17, 1916.

1,232,995.    Patented July 10, 1917.
2 SHEETS—SHEET 1.

Witnesses
Inventor
Justin M. Teijelo,
By Victor J. Evans
Attorney

J. M. TEIJELO.
DIRECTION INDICATING SIGNAL FOR MOTOR VEHICLES.
APPLICATION FILED MAR. 17, 1916.
1,232,995.
Patented July 10, 1917.
2 SHEETS—SHEET 2.
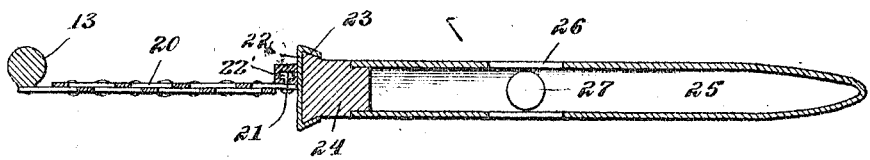
Fig. 3
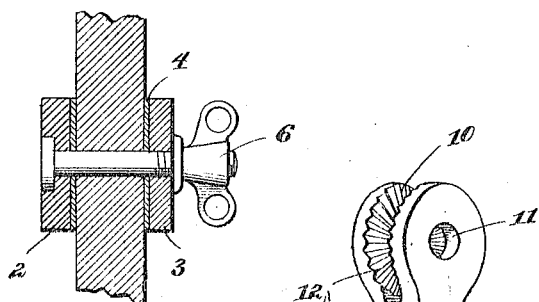
Fig. 4
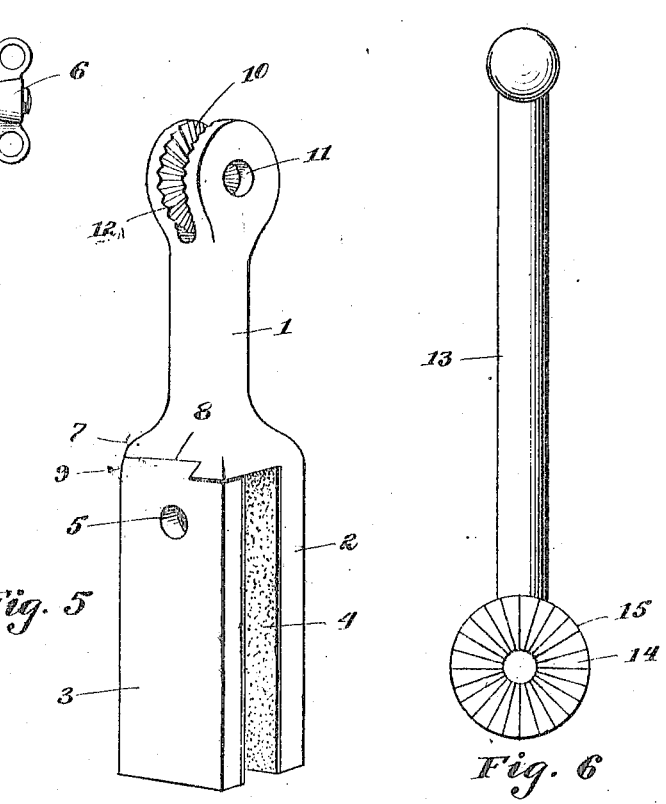
Fig. 5
Fig. 6
Inventor
Justin M. Teijelo,
By Victor J. Evans
Attorney
Witnesses
C. F. Rudolph
John J. McCarthy

UNITED STATES PATENT OFFICE.

JUSTIN M. TEIJELO, OF NEW ORLEANS, LOUISIANA.

DIRECTION-INDICATING SIGNAL FOR MOTOR-VEHICLES.

1,232,995.   Specification of Letters Patent.   Patented July 10, 1917.

Application filed March 17, 1916. Serial No. 84,876.

*To all whom it may concern:*

Be it known that I, JUSTIN M. TEIJELO, a citizen of the United States, residing at New Orleans, in the county of Orleans and State of Louisiana, have invented new and useful Improvements in Direction-Indicating Signals for Motor-Vehicles, of which the following is a specification.

This invention relates to improvements in direction indicating signals for motor vehicles and has particular application to a hand operated signal whereby the driver of the vehicle equipped with the signal may indicate to the drivers of other vehicles when he is about to turn to the left or to the right.

In carrying out the present invention, it is my purpose to improve and simplify the general construction of hand operated direction indicating signals and to provide a signal which may be operated quickly and conveniently and wherein the component parts will be so arranged and correlated as to reduce the possibility of derangement to a minimum.

With the above and other objects in view, the invention consists in the construction, combination and arrangement of parts hereinafter set forth in and falling within the scope of the claim.

In the accompanying drawings:

Fig. 3 is a longitudinal sectional view on the line 3—3 of Fig. 1.

Fig. 4 is a sectional view on the line 4—4 of Fig. 1.

Fig. 5 is a perspective view of a detail of the invention.

Fig. 6 is a side elevation of another detail.

Figures 1, 2:
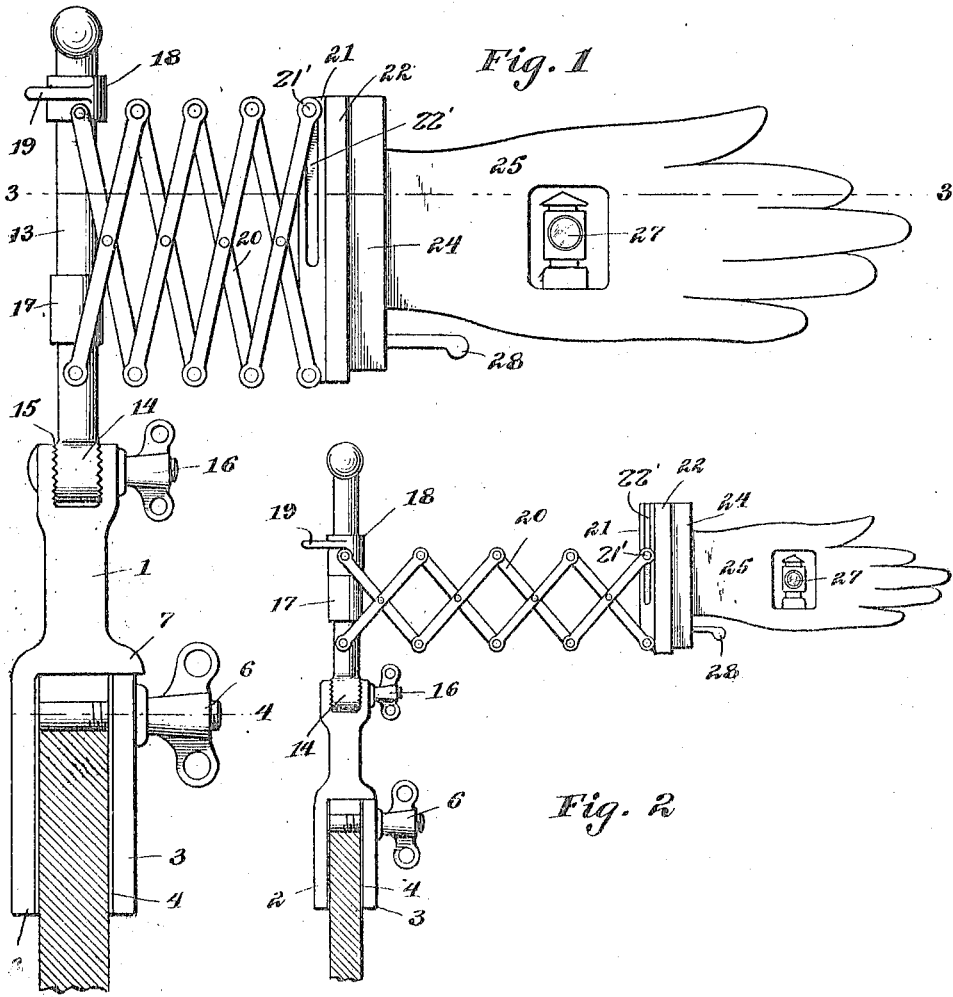
Figure 1 is a view in elevation of a direction indicating signal constructed in accordance with the present invention, the same being shown as applied to a part of a motor vehicle, the latter being shown in section.
Fig. 2 is a similar view showing the signal in signaling position.

Referring now to the drawings in detail, 1 designates a vertical supporting arm having one end formed with a clamp embodying, in the present instance, a plate 2, integral with the arm 1 and offset therefrom and adapted to engage one side of the side wall of the vehicle body, and a plate 3 adapted to engage the other side of the wall of the vehicle body. The inner surfaces of the plates 2 and 3 are lined with cloth 4 or other padding and formed in such plates are alining openings 5 through which is passed a thumb screw 6. The openings 5 in the thumb screw 6 are preferably arranged adjacent to the upper ends of the plates so that the latter may effectively clamp the side walls of the vehicle. In the present instance, the lower end of the vertical supporting arm 1 at a point diametrically opposite from the plate 2 is formed with an outward projection 7 and the bottom end of the projection 7 is disposed contiguous to the lower end of the arm and formed in the lower end of the arm and the projection thereon is a dovetailed guideway 8 in which is slidably mounted a dovetailed tongue 9 formed on the upper end of the plate 3. Thus, the plate 3 is held connected to the arm independently of the clamping screw 6. The upper end of the supporting arm 1 is bifurcated as at 10 and the limbs of the bifurcated portion are yieldable and rounded and formed centrally with alining openings 11, while formed on the confronting faces of such limbs are teeth 12 radiating from the openings 11.

13 designates a vertical rod having the lower end thereof formed with a disk-like bearing 14 disposed between the rounded limbs of the bifurcated end 10 of the supporting arm 1. The opposite sides of this bearing 14 are formed with teeth 15 adapted to interlock with the teeth 12 and passed through the openings 11 and the bearing 14 is a clamping screw 16 whereby the rod 13 may be held in adjusted position upon the arm 1. Surrounding the rod 13 a short distance above the bearing 14 is a bumper collar 17, while loosely encircling the upper end portion of the rod 13 is a collar 18 equipped with an outwardly projecting handle 19 whereby the collar 18 may be moved downwardly and upwardly upon the rod 13. 20 designates a lazy tongs structure having the ends of the levers at one end thereof pivotally connected to the collar 18 and to the rod 13 below the collar 17 respectively. Suitably connected to the free ends of the levers of the lazy tongs structure at the other end thereof is a block 21. In the present instance, one of the levers of the lazy tongs structure is pivotally connected with the block 21 at the lower end thereof, while the other end is equipped with a pin 21' that works in a slot 22' formed in the block 21, as clearly illustrated in Fig. 2 of the drawings. Secured to the outer edge of the block 21 is a holder 22 having the outer edge thereof formed with a dovetailed groove 23 closed at its lower end and slidably mounted in the groove 23 is a block 24 carrying a signaling hand 25. In the present instance, the palm of the hand 25 is formed with a recess 26 and secured within the recess 26 is a suitable form of lamp 27 adapted to be illuminated at night so that the hand may be rendered visible. Secured to the block 24 below the connection between the block and the hand 25 is a thumb piece 28 designed to facilitate the insertion of the block 24 in the groove 23.

In practice, the supporting arm 1 carrying the rod 13, the lazy tongs structure and the signaling hand is fastened to the side wall or one of the front doors of the vehicle body and when it is desired to actuate the hand 21 to signaling position, the lever 19 is pushed down, thereby sliding the collar 18 downwardly along the rod 13 with the effect to swing the levers of the lazy tongs structure and lengthen such structure, thereby projecting the hand 25 outwardly of the side of the vehicle to signaling position.

It will, of course, be understood that a duplicate of the structure disclosed is employed upon the other side of the vehicle so that the driver of the vehicle may advise the drivers of other vehicles when he is about to turn in either direction and by operating both signal hands simultaneously the driver of the signal equipped vehicle may display a stop signal.

While I have herein shown and described the preferred form of my invention by way of illustration, I wish it to be understood that I do not limit or confine myself to the precise details of construction herein described and delineated, as modification and variation may be made within the scope of the claim and without departing from the spirit of the invention.

I claim:

In a direction indicating signal for motor vehicles, a supporting arm, a clamp on one end of said supporting arm whereby the arm may be attached to the vehicle body, a vertical rod connected to the other end of said supporting arm, a collar slidably mounted upon the upper end portion of said rod, a bumper collar surrounding said rod adjacent to the lower end portion thereof, a lazy tongs structure having the ends of the levers at one end thereof secured to said sliding collar and to said rod respectively whereby said lazy tongs may be expanded and contracted in the sliding of said first-named collar upon said rod, a holder secured to the other end of said lazy tongs structure and formed with a dovetailed groove in the outer edge thereof, a block mounted in said groove, and a signaling hand carried by said block.

In testimony whereof I affix my signature in presence of two witnesses.

JUSTIN M. TEIJELO.

Witnesses.
L. F. SEMAÉ,
ELIZABETH BRODERICK.